United States Patent
Mansour et al.

(10) Patent No.: US 9,622,233 B1
(45) Date of Patent: Apr. 11, 2017

(54) DYNAMIC USE OF ORTHOGONAL CODING TO MANAGE CONTROL CHANNEL CAPACITY

(71) Applicant: Sprint Spectrum L.P., Overland Park, KS (US)

(72) Inventors: Nagi A. Mansour, Arlington, VA (US); Kaushik Goswami, Herndon, VA (US); Abdul Kareem Mohamed Yaseen, Vienna, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 302 days.

(21) Appl. No.: 14/305,550

(22) Filed: Jun. 16, 2014

(51) Int. Cl.
*H04J 11/00* (2006.01)
*H04W 72/04* (2009.01)
*H04W 52/04* (2009.01)
*H04L 5/00* (2006.01)

(52) U.S. Cl.
CPC ......... *H04W 72/042* (2013.01); *H04L 5/0007* (2013.01); *H04W 52/04* (2013.01)

(58) Field of Classification Search
CPC ............ H07L 47/726; H04W 72/1278; H04W 28/0231; H04W 28/0242; H04W 72/0486; H04W 72/1252; H04J 13/16; H04J 13/004; H04J 1/00; H04J 3/00; H04J 13/00; H04J 15/00
See application file for complete search history.

(56) References Cited

U.S. PATENT DOCUMENTS

| 8,254,329 | B2 | 8/2012 | Ko et al. | |
|---|---|---|---|---|
| 2005/0037718 | A1* | 2/2005 | Kim | H04B 1/7097 455/101 |
| 2006/0067421 | A1 | 3/2006 | Walton et al. | |
| 2007/0223364 | A1 | 9/2007 | Terabe et al. | |
| 2008/0253311 | A1* | 10/2008 | Jin | H04B 1/662 370/311 |
| 2009/0207780 | A1* | 8/2009 | Kishigami | H04W 88/08 370/328 |

(Continued)

FOREIGN PATENT DOCUMENTS

WO    WO2011/098955    8/2011

OTHER PUBLICATIONS

U.S. Appl. No. 13/644,592, filed Oct. 4, 2012.
(Continued)

*Primary Examiner* — Hoang-Chuong Vu (57) ABSTRACT

Disclosed is a method and system for use of orthogonal coding to manage control channel load. Based on evaluation of downlink air interface load, a base station dynamically toggles use of orthogonal coding of downlink control information (DCI) messages for transmission on a downlink control channel. When downlink load is high, the base station may responsively operate in a state in which the base station orthogonally codes DCI messages to facilitate transmitting multiple DCI messages per set of resource elements on the downlink control channel, possibly boosting transmission power in those resource elements to help facilitate successful transmission. Whereas, when downlink load is not high, the base station may responsively operate in a state in which the base station does not orthogonally code DCI messages and thus sends just one DCI message per set of resource elements.

20 Claims, 9 Drawing Sheets

PORTION OF PDCCH (56) References Cited

U.S. PATENT DOCUMENTS

| | | | |
|---|---|---|---|
| 2010/0110986 A1* | 5/2010 | Nogami | H04L 1/0027 370/328 |
| 2010/0208608 A1 | 8/2010 | Wang | |
| 2010/0246376 A1 | 9/2010 | Nam et al. | |
| 2010/0246455 A1 | 9/2010 | Nangia et al. | |
| 2011/0038344 A1 | 2/2011 | Chmiel et al. | |
| 2011/0081932 A1 | 4/2011 | Astely et al. | |
| 2011/0228735 A1 | 9/2011 | Lee et al. | |
| 2011/0274197 A1* | 11/2011 | Zhu | H04L 1/0031 375/267 |
| 2012/0002746 A1 | 1/2012 | Pham | |
| 2012/0113941 A1* | 5/2012 | Chung | H04W 72/1289 370/329 |
| 2013/0070580 A1 | 3/2013 | Wang et al. | |
| 2013/0083764 A1 | 4/2013 | Kim et al. | |
| 2013/0128826 A1* | 5/2013 | Lin | H04L 1/1861 370/329 |
| 2013/0195034 A1 | 8/2013 | Noh et al. | |
| 2013/0242904 A1* | 9/2013 | Sartori | H04L 5/0053 370/329 |
| 2014/0004857 A1* | 1/2014 | Rune | H04W 48/12 455/434 |
| 2014/0071952 A1* | 3/2014 | Kim | H04L 5/001 370/335 |
| 2014/0086184 A1* | 3/2014 | Guan | H04W 72/1289 370/329 |
| 2014/0247801 A1* | 9/2014 | Oizumi | H04L 5/0037 370/329 |
| 2014/0301299 A1* | 10/2014 | Wu | H04L 5/0053 370/329 |
| 2016/0270066 A1* | 9/2016 | Seo | H04W 72/0413 |

OTHER PUBLICATIONS

Hongyan, "Physical Hybrid-ARQ Indicator Channel (PHICH)," http://lteuniversity.com/get_trained/expert_opinion1/b/hongyanlei/archive/2011/07/08/physcial-hybrid-arq-indicator-channel-phich.aspx, Jul. 8, 2011.

Jialing Liu, et al., "Design and Analysis of LTE Physical Downlink Control Channel," IEEE, Spring 2009.

Min Lee and Seong Keun Oh, "On Resource Block Sharing in 3GPP-LTE System," 17th Asia-Pacific Conference on Communications (APCC), IEEE, 2011.

Rana A. Abdelaal, et al., "Resource Allocation Strategies Based on the Signal-to-Leakage-plus-Noise Ration in LTE-A CoMP Systems," Proceedings of IEEE wireless Communications and Networking Conference (WCNC), 2012.

"Uplink Control Channel Format 1," accessed on May 17, 2012 from www.steepestascent.com/content/mediaassets/html/LTE/help/PUCCH Format 1.html.

Jaimin Patel, "LTE MIMO Concepts," posted to www.4gwirelessjobs.com on Jun. 27, 2010.

* cited by examiner

DYNAMIC USE OF ORTHOGONAL CODING TO MANAGE CONTROL CHANNEL CAPACITY

BACKGROUND

Unless otherwise indicated herein, the materials described in this section are not prior art to the claims and are not admitted to be prior art by inclusion in this section.

In a wireless communication system, a base station may transmit downlink data to one or more wireless communication devices (WCDs) that are operating in a wireless coverage area provided by the base station. The wireless coverage area could be, for example, a cell or a sector. The base station may also receive uplink data from one or more WCDs operating in the wireless coverage area.

Some of the downlink data transmitted by the base station may be transmitted in a downlink channel that can be shared among multiple WCDs. For example, the Long Term Evolution (LTE) of the Universal Mobile Telecommunications System (UMTS) defines a Physical Downlink Shared Channel (PDSCH) as the primary downlink channel for transmitting user data to WCDs. In addition, LTE defines downlink control channels that carry various types of control signaling. The downlink control channels include a Physical Control Format Indicator Channel (PCFICH), a Physical Hybrid ARQ Indicator Channel (PHICH), and a Physical Downlink Control Channel (PDCCH).

In the LTE approach, downlink resources are mapped in the time domain and in the frequency domain. In the time domain, LTE defines 10 millisecond (ms) frames, 1 ms sub-frames and 0.5 ms slots. Thus, each frame has 10 sub-frames, and each sub-frame has 2 slots. In the frequency domain, resources are divided into groups of 12 sub-carriers. Each sub-carrier is 15 kHz wide, so each group of 12 sub-carriers occupies a 180 kHz bandwidth. The 12 sub-carriers in a group are modulated together, using orthogonal frequency division multiplexing (OFDM), to form one OFDM symbol.

LTE further defines a particular grouping of time-domain and frequency-domain resources as a downlink resource block. In the time domain, each downlink resource block has a duration corresponding to one sub-frame (1 ms). In the frequency domain, each downlink resource block consists of a group of 12 sub-carriers that are used together to form OFDM symbols. Typically, the 1 ms duration of a downlink resource block accommodates 14 OFDM symbols, each spanning 66.7 microseconds, with a 4.69 microsecond guard band (cyclic prefix) added to help avoid inter-symbol interference. Depending on the bandwidth of the system, multiple downlink resource blocks can be transmitted in each 1 ms sub-frame. For example, a system with a 5 MHz bandwidth may be able to transmit 25 downlink resource blocks in each 1 ms sub-frame. Whereas, a system with a 15 MHz bandwidth may be able to transmit 75 downlink resource blocks in each 1 ms sub-frame.

The smallest unit of downlink resources is the resource element. Each resource element corresponds to one sub-carrier and one OFDM symbol. Thus, a resource block that consists of 12 sub-carriers and 14 OFDM symbols has 168 resource elements. Further, each OFDM symbol and thus each resource element can represent a number of bits, with the number of bits depending on how the data is modulated. For instance, with Quadrature Phase Shift Keying (QPSK) modulation, each modulation symbol may represent 2 bits; with 16 Quadrature Amplitude Modulation (16QAM), each modulation symbol may represent 4 bits; and with 64QAM, each modulation symbol may represent 6 bits.

Within a resource block, different resource elements can have different functions. In particular, a certain number of the resource elements (e.g., 8 resource elements) may be reserved for reference signals used for channel estimation. In addition, a certain number of the resource elements (e.g., resource elements in the first one, two, or three OFDM symbols) may be reserved for control signals in the PCFICH, PHICH, and PDCCH channels. In the frequency domain, the resource elements that define these control channels in each sub-frame cooperatively span all of the resource blocks across the bandwidth, leaving most of the remaining resource elements in the resource blocks available for use to carry user data in the PDSCH channel.

In practice, the PCFICH indicates how many OFDM symbols (how many symbol time segments) in each sub-frame are reserved to define the control channels. Further, of the resource elements in the indicated OFDM symbols, a particular set of the resource elements may be set aside to define the PCFICH and PHICH, leaving the remaining resource elements for use to define the PDCCH. For example, 16 resource elements in the first OFDM symbol may define the PCFICH, and a certain number of resource elements in the indicated OFDM symbols may define the PHICH. Consequently, the size of the PDCCH may depend largely on how many OFDM symbols are reserved to define the control channels.

One of the main functions of the PDCCH is to carry downlink control information (DCI) messages to served WCDs. A DCI message spans a particular set of resource elements on the PDCCH (e.g., one, two, three, or four control channel elements (CCEs), each including 36 resource elements) and provides a served WCD with information indicating how the WCD should receive data on the PDSCH in the same sub-frame, or how the WCD should transmit data on an uplink shared channel in an upcoming sub-frame. For instance, a DCI message may specify particular resource blocks that carry data to the WCD on the PDSCH, what modulation scheme is used for the transmission, and so forth. Further, each DCI message may include a cyclic redundancy check (CRC) that is scrambled with an identifier (e.g., cell radio network temporary identifier (C-RNTI)) assigned to the WCD, so that the WCD can identify and read the DCI message.

OVERVIEW

In a system like described above, the number of OFDM symbols set aside to define the downlink control channels across the bandwidth in each sub-frame is inversely proportional to the number of OFDM symbols available to carry data on the PDSCH in each sub-frame. In particular, as each sub-frame spans 14 OFDM symbols and resource elements of the first one, two, or three OFDM symbols are set aside to define the control channels, then the PDSCH would span resource elements of just the remaining eleven, twelve, or thirteen OFDM symbols. It follows that as more OFDM symbols are set aside to define the control channels, less capacity there would be available to carry user data on the PDSCH. Consequently, to support serving a greater number of WCDs at a time, or to support serving WCDs at higher data rates, it would be desirable to have fewer OFDM symbols set aside for control channel use.

On the other hand, as the PDCCH carries DCI messages to WCDs to facilitate transmission of data to and from the WCDs, it is also important to have sufficient PDCCH capacity to facilitate transmission of DCI messages to potentially many WCDs in a given sub-frame. Consequently, it may be desirable to have more OFDM symbols set aside for control channel use, so as to increase the PDCCH capacity per sub-frame.

Disclosed herein is a method and system to help address these competing concerns. In accordance with the disclosure, a base station will evaluate the level of load in its wireless coverage area and, based on the level of load, will dynamically toggle use of orthogonal coding of DCI messages for transmission on the PDCCH. For instance, when the base station detects high load on the PDCCH (e.g., a trend of high percentage use of PDCCH resource elements) and/or high load on the PDSCH (e.g., a trend of high percentage use of PDSCH resource elements), the base station may responsively operate in a state in which the base station orthogonally codes DCI messages to facilitate transmitting multiple DCI messages per set of resource elements. Whereas, when the base station detects low load on the PDCCH and/or low load on the PDSCH, the base station may responsively operate in a state in which the base station does not orthogonally code DCI messages and thus sends just one DCI message per set of resource elements. Through this process, the base station may thereby use orthogonal coding to dynamically manage control channel capacity.

Accordingly, in one respect, disclosed is a method operable by a base station that provides a downlink air interface, where the downlink air interface defines a downlink control channel including a plurality of sets of resource elements each spanning a respective sub-carrier and a respective segment of time, and wherein the base station transmits downlink control information (DCI) messages to WCDs on the downlink control channel. In accordance with the method, the base station determines a level of load on the downlink air interface, and, based at least in part on the determined level of load, makes a decision of whether to encode the DCI messages with orthogonal codes to facilitate transmitting multiple DCI messages on each set of resource elements. The base station then operates in accordance with the decision.

In another respect, disclosed is a method operable by a WCD served by a base station, where the base station provides a downlink control channel transmission that includes transmission on a plurality of sets of resource elements, with each resource element spanning a respective sub-carrier and a respective segment of time, and each set of resource elements carrying n respective DCI messages, with a set of n orthogonal codes applied to encode the n respective DCI messages carried by every set of resource elements. In accordance with the method, the WCD engages in blind decoding of the received downlink control channel transmission, including applying the N orthogonal codes to uncover the DCI messages carried each set of resource elements until the WCD finds in the downlink control channel transmission a DCI message destined to the WCD. Further, the WCD then engages in communication with the base station in accordance with DCI message destined to the WCD, such as by receiving data from the base station on PDSCH resources indicated by the DCI or transmitting data to the base station on uplink shared channel resources indicated by the DCI.

Further, in yet another respect, disclosed is a base station. The base station includes a transmitter for transmitting over a downlink air interface to WCDs operating in a wireless coverage area of the base station, where the downlink air interface defines a downlink control channel including a plurality of sets of resource elements each spanning a respective sub-carrier and a respective segment of time, and the base station transmits DCI messages to the WCDs on the downlink control channel. Further, the base station includes a controller, possibly integrated with the transmitter, configured to (i) determine, a level of load on the downlink air interface, (ii) based at least in part on the determined level of load, make a decision of whether to encode the DCI messages with orthogonal codes to facilitate transmitting multiple DCI messages on each set of resource elements, and (iii) cause the base station to operate in accordance with the decision.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

In line with the discussion above, this disclosure provides for dynamically toggling use of orthogonal coding to help manage control channel capacity, by allowing more than one DCI message to be transmitted on the same set of resource elements. More particularly, based on an evaluation of load on the downlink air interface, a base station may decide whether to operate in a mode in which the base station would orthogonally encode DCI messages so that multiple DCI messages, each destined to a different WCD, can be transmitted on the same set of resource elements, thus facilitating sharing of those resource elements among multiple users.

In an example embodiment, the PDCCH may have various sets of resource elements (e.g., each set including one, two, three, or four consecutive CCEs) on which the base station can transmit DCI messages to WCDs. Without orthogonal coding, the base station would transmit up to one DCI message respectively on each set of resource elements. In practice, each DCI message may include a bit string representing DCI information, plus a CRC masked (scrambled) with the destination WCD's identifier (C-RNTI).

To facilitate transmission of DCI information to a particular WCD, the base station would compute a CRC from the DCI information and would then mask the CRC with the WCD's identifier, so as to produce a DCI message including the DCI information and the masked CRC. The base station would then modulate the bits of the DCI message for transmission on one of the sets of resource elements, using QPSK modulation for instance (so that each resource element represents 2 bits of the DCI message). For a given sub-frame, the base station may thus carry out this process separately for each of various WCDs to which the base station will transmit a respective DCI message, with the number of such DCI message transmissions in the sub-frame being limited by capacity of the PDCCH.

As a WCD receives the PDCCH transmission from the base station, the WCD may not know which set of resource elements (if any) would carry a DCI message destined to the WCD. To enable the WCD to find such a message, LTE defines a blind decoding process, by which the WCD scans through the sets of resource elements on the PDCCH in search of one that carries data whose CRC is masked with the WCD's identifier. If and when the WCD finds such a set of resource elements, the WCD then reads the DCI information from the DCI message and operates accordingly, such as to then receive data on indicated PDSCH resources for instance.

In accordance with the present disclosure, when the base station dynamically operates with orthogonal coding of DCI messages based on evaluation of load on the downlink air interface, the base station may then transmit more than one DCI message on each set of resource elements. For instance, the base station may transmit two DCI messages on each set of resource elements, with one of the DCI messages destined to one WCD, and the other DCI message destined to another WCD. In this way, the base station may thus double the capacity of the PDCCH for carrying DCI messages. Further, the base station may boost the transmission power that it uses for transmission in those resource elements, to help ensure successful transmission and receipt of the increased quantity of data in each set of resource elements.

In practice, the base station may use the same orthogonal codes to effectively multiply the capacity of each set of resource elements on the PDCCH, without a need to assign particular orthogonal codes to particular WCDs. For instance, if the PDCCH in each sub-frame defines m sets of resource elements for carrying DCI messages, and if the base station uses two orthogonal codes to facilitate orthogonally encoding two separate DCI messages respectively on each set of resource elements, the base station may thereby transmit in the sub-frame up to 2m DCI messages rather than just m DCI messages. More generally, if the base station uses n orthogonal codes to facilitate orthogonally encoding n separate DCI messages respectively on each set of resource elements, the base station may thereby transmit in the sub-frame up to nm DCI messages rather than just m DCI messages.

When a WCD receives the PDCCH transmission from the base station, the WCD may then engage in an enhanced blind decoding process. In particular, the WCD may scan through the sets of resource elements on the PDCCH, applying each orthogonal code to uncover the multiple DCI messages (if any) on each set, until the WCD finds a DCI message whose CRC is masked with the WCD's identifier. If and when the WCD finds such a DCI message, the WCD may then read the DCI message and operate accordingly.

The orthogonal codes that the base station uses to orthogonally encode two or more DCI messages respectively for transmission on each set of resource elements, and that WCDs would thus use to decode DCI messages through the enhanced blind decoding process, could be any type of mutually orthogonal codes. Walsh codes are one class of such orthogonal codes. In general, a set of n orthogonal codes could be any set of n mutually orthogonal vectors in an n-dimensional space. The n orthogonal codes could thus facilitate shared transmission of up to n DCI messages on the same set of resource elements.

The mutual orthogonality of the codes can be expressed in terms of the dot products between any two codes $C_i$ and $C_j$. Specifically, mutual orthogonality means the following:

$$C_i \cdot C_j = 0, \text{ if } i \neq j; \text{ and}$$

$$C_i \cdot C_j = k, \text{ if } i = j \text{ (where } k \text{ is a non-zero constant).} \tag{1}$$

As a result of this mutual orthogonality, the data of n DCI messages to be transmitted on the same set of resource elements can be expressed as a linear combination, L, as follows:

$$L = D_1 C_1 + D_2 C_2 + \ldots + D_n C_n \tag{2}$$

where $D_i$ is the data for the ith DCI message and $C_i$ is the orthogonal code assigned to the ith DCI message.

The data of a particular DCI message, p, can then be recovered from this linear combination by using $C_p$, the orthogonal code assigned to DCI message p, as follows:

$$D_p = (C_p \cdot L)/k \tag{3}$$

Thus, when orthogonal codes are used to encode the data of multiple DCI messages, the orthogonal code of each respective DCI message can be used to recover the DCI message data from the encoded data.

This approach can thus be used to encode and decode digital data representing the multiple DCI messages transmitted respectively on each set of resource elements. For example, if each DCI message data, $D_i$, is a block of data consisting of b bits, and each element of orthogonal code $C_i$ is also b bits, then the linear combination, L, that results from encoding the data from n DCI messages could be expressed as a sequence of nb bits.

In an OFDM communication system, the encoding of data using orthogonal codes may occur outside of the OFDM transmitter and the decoding of data may occur outside of the OFDM receiver. Thus, DCI message data may be encoded using orthogonal codes and then provided to an OFDM transmitter in encoded form. Similarly, the DCI message data output from an OFDM receiver could be encoded data that is subsequently decoded using one or more orthogonal codes. In this way, the use of orthogonal codes to transmit multiple DCI messages respectively on each set of PDCCH resource blocks need not change the operations at the physical layer of an OFDM communication system. Put another way, orthogonal codes can be used in a manner that is transparent to the OFDM transmitter and OFDM receiver.

Figure 1:
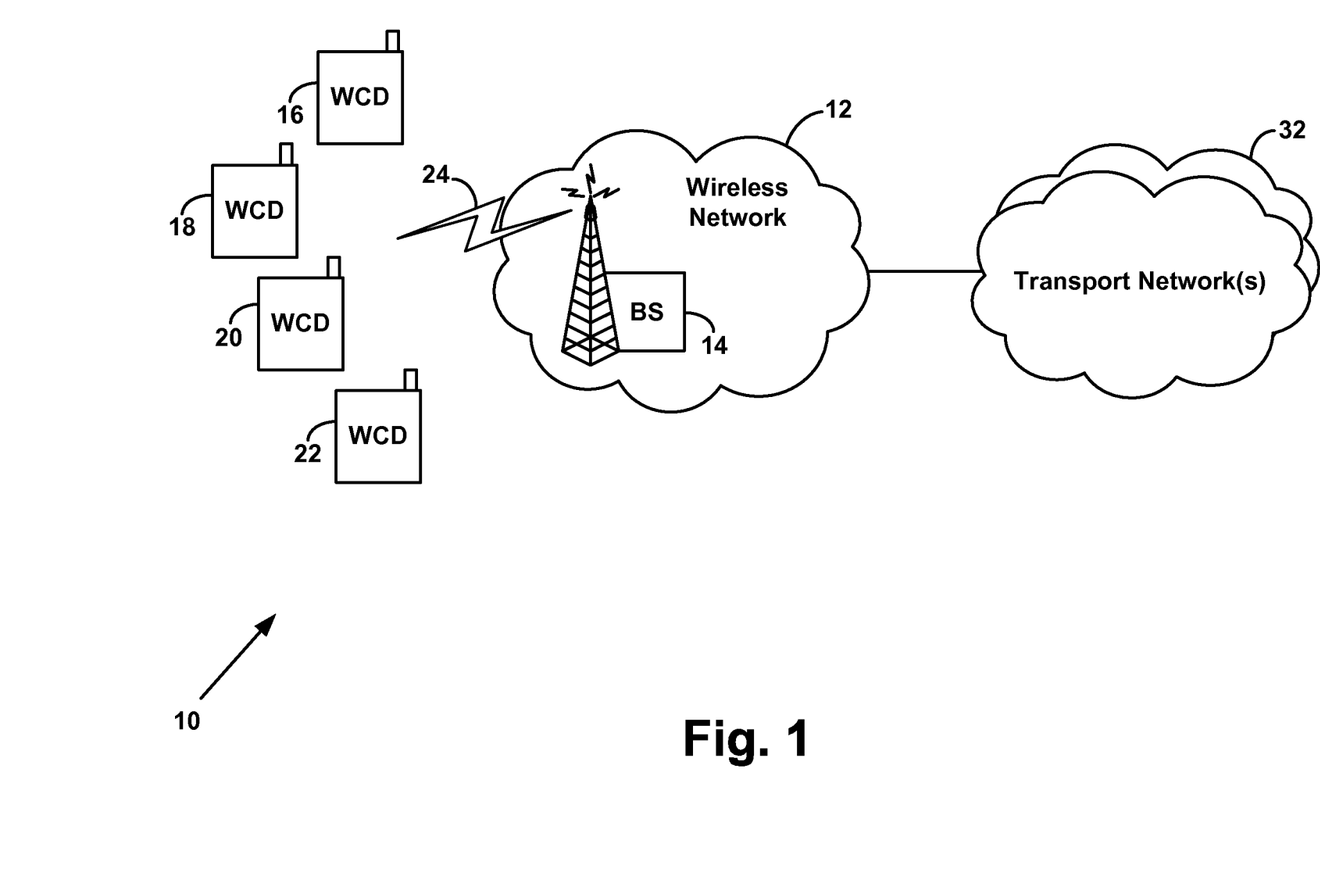
FIG. 1 is a block diagram of a communication system in which example embodiments can be implemented.

FIG. 1 is a block diagram of a communication system 10 in which example embodiments may be implemented. Communication system 10 includes a wireless network 12 that includes one or more entities that can communicate over an air interface, as exemplified by base station (BS) 14. Wireless network 12 could also include one or more control entities, such as a base station controller (BSC), radio network controller (RNC), or mobility management entity (MME). Wireless network 12 could be, for example, a radio access network (RAN). BS 14 could be, for example, a base transceiver station, a wireless access point, an access node, a Node-B, or an eNodeB. Although FIG. 1 shows only one base station in wireless network 12, it is to be understood that wireless network 12 could include any number of base stations.

BS 14 radiates to define one or more wireless coverage areas within which BS 14 can wirelessly communicate with WCDs. The wireless coverage area defined by BS 14 could be a cell that generally surrounds BS 14. Alternatively, BS 14 may define multiple wireless coverage areas, such as sectors. Each sector may be defined by multiple antennas in BS 14 so as to generally correspond to a range of azimuthal angles (e.g., 120°) about BS 14.

For purposes of illustration, BS 14 is shown as being in wireless communication with WCDs 16, 18, 20, 22 generally over an air interface 24. WCDs 16-22 could be wireless telephones, wireless handheld or laptop computers, mobile tracking devices, embedded wireless communication modules, or other types of wireless communication devices. Although FIG. 1 shows BS 14 in wireless communication with four WCDs, it is to be understood that BS 14 could be in wireless communication with a greater or fewer number of WCDs. In addition, the number of WCDs in wireless communication with BS 14 can change over time, for example, as a result of one or more WCDs moving into or out of the wireless coverage area of BS 14 and/or as a result of one or more WCDs beginning or ending communication sessions.

Air interface 24 could include a respective uplink, on which the WCDs can transmit data to BS 14, and a respective downlink, on which BS 14 can transmit data to the WCDs. The communications over air interfaces 24 could conform to any wireless protocol now known or later developed. For purposes of illustration, as noted above, the communications over air interface 24 will be described herein with respect to the LTE protocol.

Wireless network 12 may provide connectivity with one or more transport networks 32, which could include, for example, the public switched telephone network (PSTN) and/or the Internet or other packet-switched networks. With this arrangement, a WCD being served by BS 14 may engage in a communication session, via wireless network 12, with an endpoint connected to one of transport networks 32. The endpoint could be, for example, another WCD, a landline telephone, an email server, Web server, media server, or gaming server. The communication session could involve voice, text, images, video, data, or other media that is transferred from the WCD to the endpoint and/or from the endpoint to the WCD.

Thus, when a WCD, such as WCD 16, 18, 20, or 22, is involved in a communication session, the WCD may transmit data over an uplink channel to BS 14 and may receive data from BS 14 over a downlink channel. In some cases, the communication session could be one that involves a user of the WCD, such as a voice communication application or Web browsing application. In other cases, the communication session could involve a background task, such as periodically registering with wireless network 12.

Figure 2A:
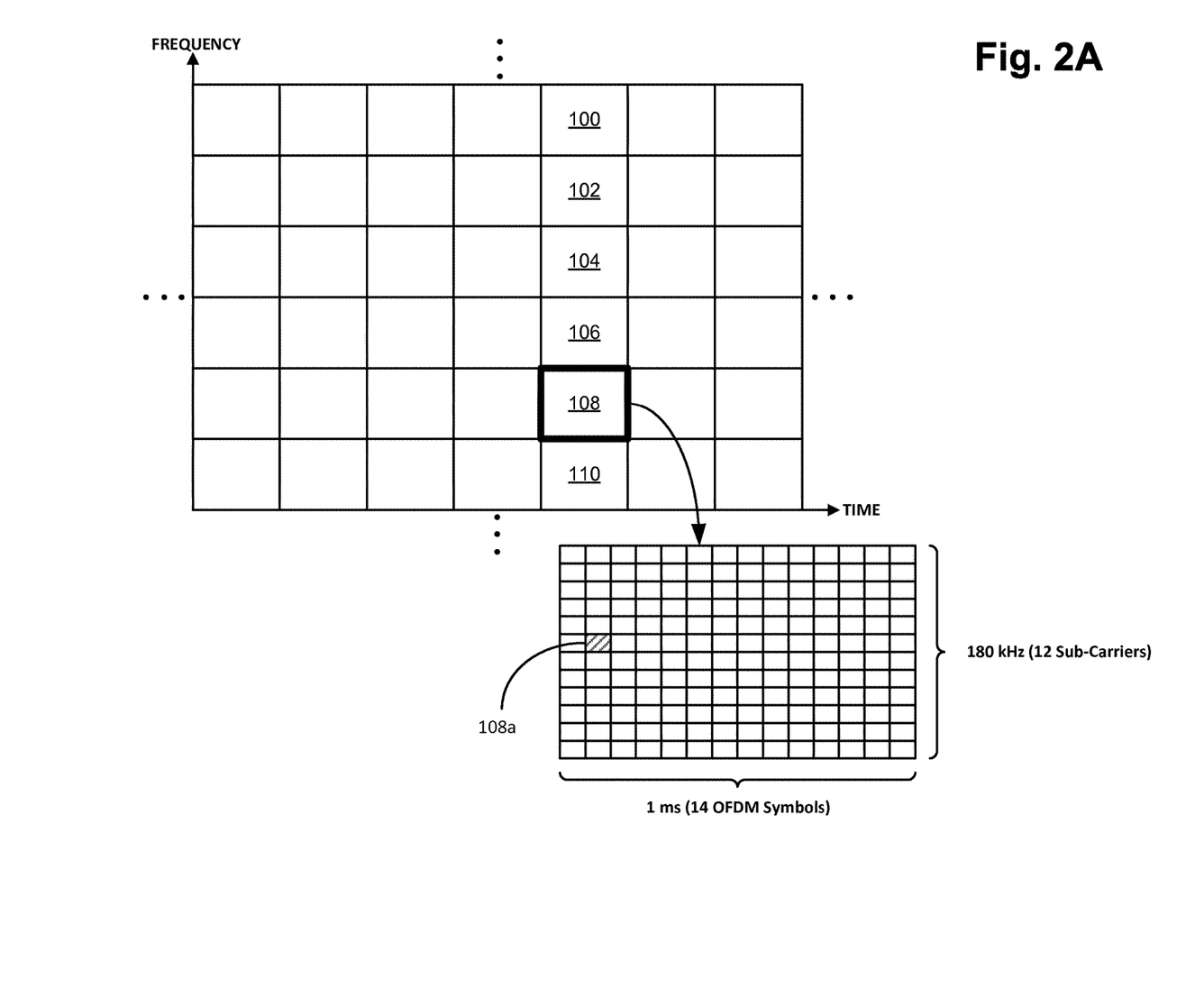
FIG. 2A is a conceptual illustration of a division of a shared downlink channel into downlink resource blocks, in accordance with an example embodiment.

In some implementations, BS 14 may transmit data to WCDs 16-22 over a shared downlink channel. The usage of the shared downlink channel may be controlled by BS 14 or by some other entity in wireless network 12. As noted above, for example, the LTE protocol defines the PDSCH that a base station can use to transmit data to multiple WCDs that are operating in its wireless coverage area, with portions of the PDSCH being allocated to particular WCDs in the form of downlink resource blocks. FIG. 2A illustrates how the downlink resources in a given wireless coverage area may be divided in time and frequency domains into resource blocks. In the time domain, each resource block occupies a 1 ms sub-frame. By way of example, FIG. 2A shows resource blocks 100-110 for a particular sub-frame. In the frequency domain, each of resource blocks 100-110 occupies a respective portion of frequency bandwidth, typically 180 kHz in LTE implementations. Although FIG. 2A shows six resource blocks in each sub-frame, a wireless coverage area could have a greater number of resource blocks, as indicated by the dots above and below resource blocks 100-110. (As noted above, for instance, in a 5 MHz LTE band, a total of 25 resource blocks may span each 1 ms sub-frame.)

FIG. 2A also includes a more detailed view of downlink resource block 108. This detailed view shows that the 180 kHz of frequency bandwidth corresponds to 12 sub-carriers of 15 kHz each, and also shows that the 1 ms sub-frame corresponds to the duration of 14 OFDM symbols (although the number of OFDM symbols in a downlink resource block can vary). Each OFDM symbol spans the 12 sub-carriers and includes a respective sub-carrier symbol on each sub-carrier. Thus, as noted above, a downlink resource block may be described as a set of resource elements, with each resource element corresponding to a sub-carrier symbol that is carried on a particular sub-carrier for the duration of one OFDM symbol. The detailed view of downlink resource block 108 in FIG. 2A shows the division of the resource block into multiple resource elements, such as resource element 108a.

As noted above, each sub-carrier symbol or resource element represents a data block of a certain number of bits depending on the type of modulation that is used. For example, as noted above, if QPSK is used for the sub-carrier symbols, then each sub-carrier symbol represents two bits of data. Whereas, if QAM is used for the sub-carrier symbols, then each sub-carrier symbol represents a greater number of bits, such as four bits per symbol for 16QAM and six bits per symbol for 64QAM.

Figure 2B:
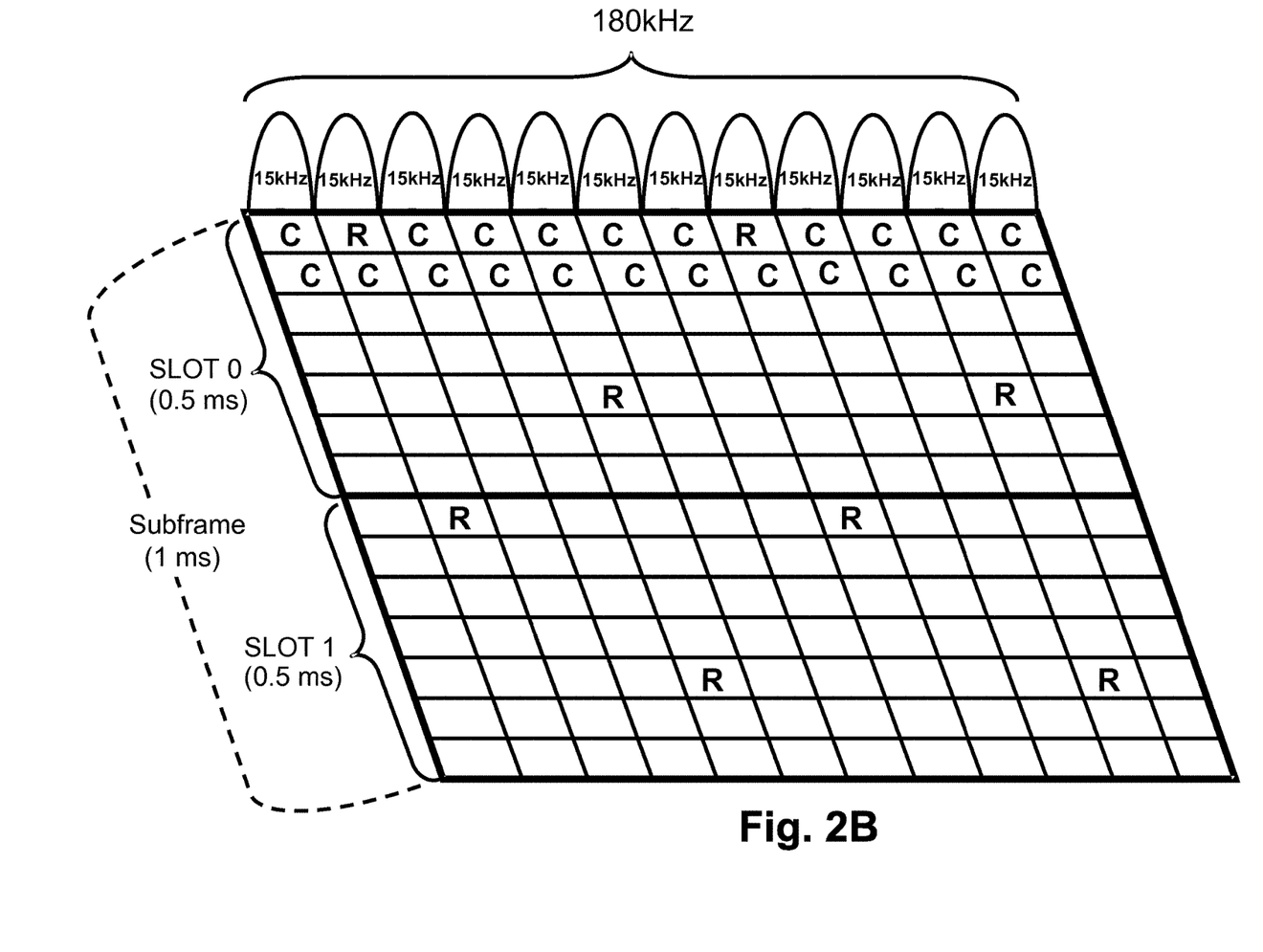
FIG. 2B is a conceptual illustration of a downlink resource block, in accordance with an example embodiment.

As further noted above, different resource elements in a downlink resource block may be used for different purposes. FIG. 2B illustrates different functions among the 168 resource elements in an example downlink resource block. In this example, 8 of the resource elements are labeled "R" to indicate that they are reserved for reference signals used for channel estimation. In addition, 22 of the resource elements in the first two OFDM symbols are labeled "C" to indicate that they are used to transmit control signaling (PCFICH, PHICH, and PDCCH channels). The other 138 resource elements that are unlabeled can be used to transmit user data (PDSCH channel). It is to be understood that FIG. 2B illustrates only one possible configuration, and that a downlink resource block could have other configurations.

Figure 2C:
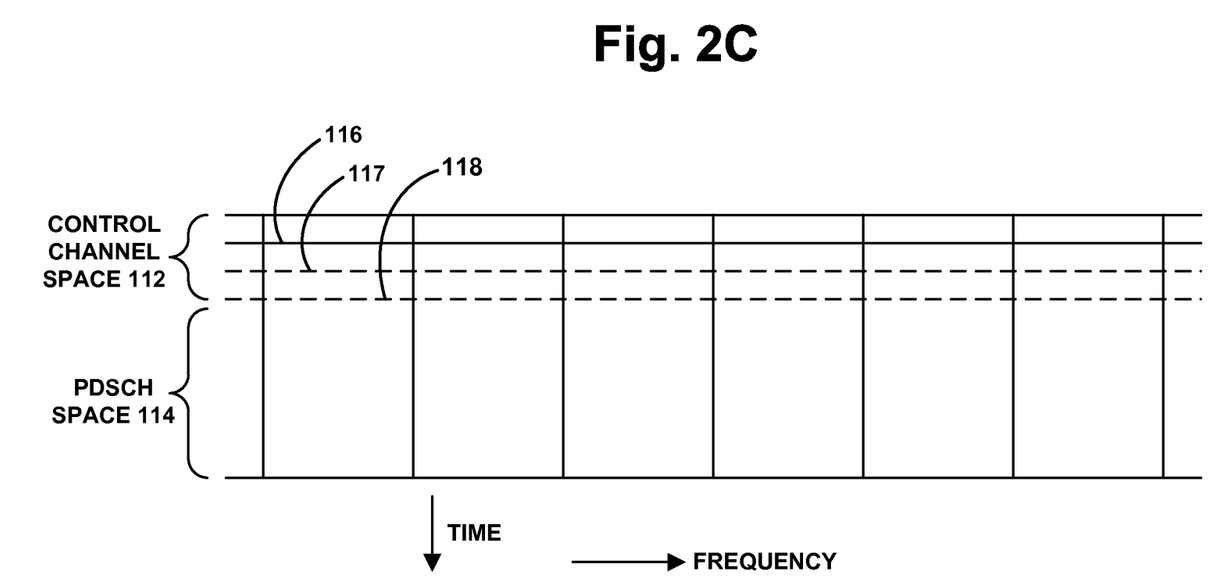
FIG. 2C is a conceptual illustration of a segment of a downlink sub-frame, depicting a relationship between control channel capacity and shared channel capacity.

FIG. 2C next depicts a segment of an example downlink sub-frame, to help illustrate the relationship between control channel capacity and PDSCH capacity. In particular, FIG. 2C provides another view of the six resource blocks 100-110 of FIG. 2A. As shown, a first portion of time (one or more OFDM symbol segments) of each resource block is reserved for use to define control channel space 112 that spans all of the resource blocks in the sub-frame. The remaining portion of each resource block is then available for use to define PDSCH space 114. Lines 116, 117, and 118 in FIG. 2C illustrate how the extent of space allocated to the control channels could vary. Solid line 116 represents a possible demarcation between the control channel space and the PDSCH space where only one OFDM symbol is used for the control channel space, which as noted above would leave thirteen OFDM symbols in each resource block for PDSCH use. Dashed line 117 represents a different possible demarcation between the control channel space and the PDSCH space where two OFDM symbols are used for the control channels, leaving twelve OFDM symbols in each resource block for PDSCH use. And dashes line 118 represents still a different possible demarcation between the control channel space and the PDSCH space where three OFDM symbols are used for the control channel space, leaving just eleven OFDM symbols in each resource block for PDSCH use.

As noted above, the PCFICH would indicate which of these (or possibly other control channel formats is in use). In particular, the PCFICH may provide two bits that specifies a control channel format indicating the number of OFDM symbols defining the control channel space. When a WCD receives downlink transmission from the base station, the WCD may thus read the PCFICH to determine the control channel format and engage in blind decoding as described above.

Figure 3A:
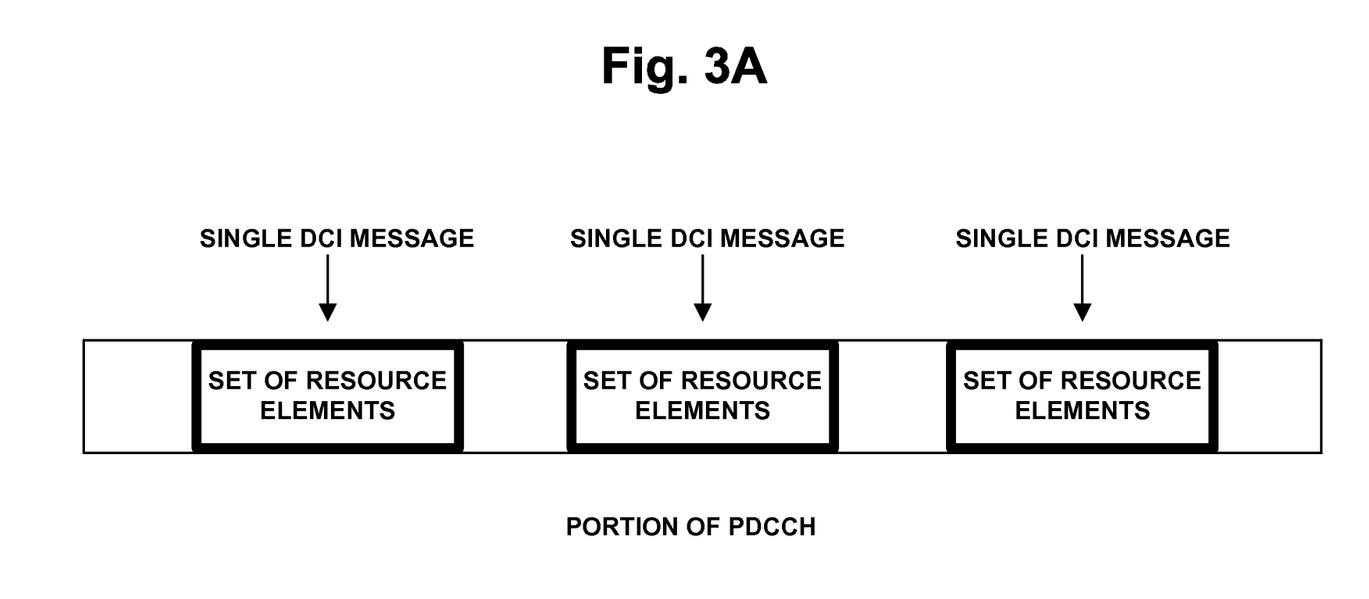
FIG. 3A is a conceptual illustration of a segment of a PDCCH, depicting examples of sets of resource elements that each carry a single DCI message without orthogonal coding.
Figure 3B:
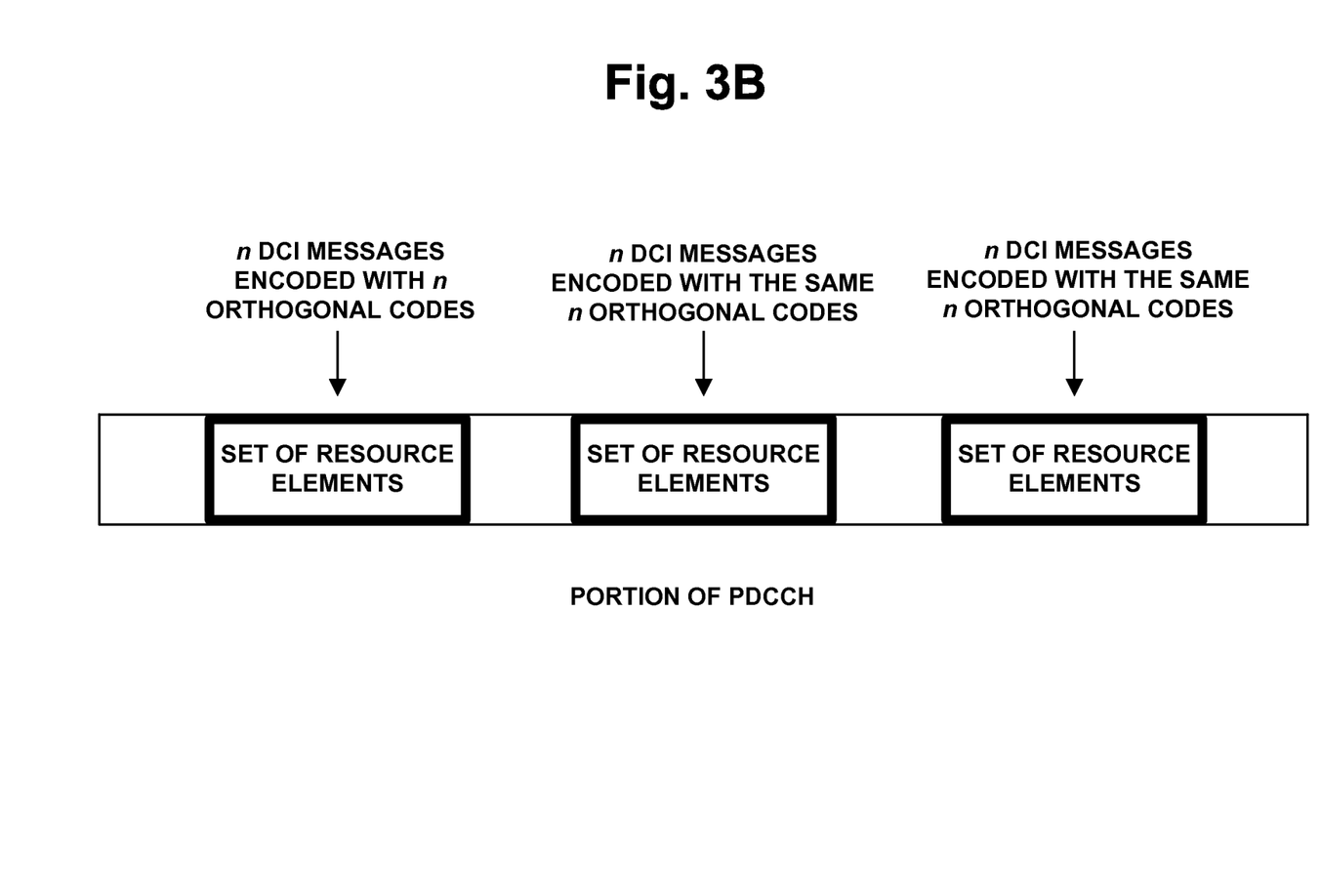
FIG. 3B is a conceptual illustration of a segment of a PDCCH, depicting examples of sets of resource elements that each multiple DCI messages with orthogonal coding.

FIGS. 3A and 3B next illustrate a portion of an example PDCCH, showing how the PDCCH includes sets of resource elements for carrying DCI messages, particularly illustrating three example sets of resource elements in the PDCCH. Further, FIG. 3A shows a single DCI message being carried respectively on each set of resource elements. Whereas, FIG. 3B shows n DCI messages being carried respectively on each set of resource elements, with the n DCI messages per set of resource elements being encoded respectively with n orthogonal codes. As discussed above, base station 14 may evaluate load on the downlink air interface and, based on the load, may responsively operate either without orthogonal coding of DCI messages as shown in FIG. 3A or with orthogonal coding of DCI messages as shown in FIG. 3B.

In practice, the base station's evaluation of downlink air interface load may take various forms. For instance, the base station may maintain a statistical measure of the percentage of PDCCH resource elements used over time (e.g., over a recent past number of frames) as a measure of PDCCH load, and/or the base station may maintain a statistical measure of the percentage of PDSCH resource elements or resource blocks used over time as a measure of PDSCH load.

On an ongoing basis, such as every frame or every sub-frame, the base station may then make a determination, based on the downlink air interface load, of whether or not to operate with orthogonal coding of DCI messages. In each such instance, for example, the base station may compare load on the PDCCH to a predefined (or dynamically established) threshold, such as a particular percentage deemed to indicate high load, to determine if the PDCCH load is higher than that threshold. Further, the base station may compare load on the PDSCH to a predefined (or dynamically established) threshold, such as a particular percentage deemed to indicate high load, to determine if the PDSCH load is higher than that threshold.

The base station may then make its decision regarding orthogonal encoding of DCI messages based on such load evaluations. For instance, if the base station thus determined that the PDCCH and/or PDSCH are experiencing threshold high load (as a trend or currently), then the base station may responsively operate with orthogonal coding of DCI messages, which may help minimize the number of ODFM symbols needed for PDCCH use and thereby free up more OFDM symbols for PDSCH use, or, or may facilitate transmission of a greater number of DCI messages at once on the PDCCH. Whereas if the base station thus determined that the PDCCH and/or PDSCH are not experiencing threshold high load, then the base station may responsively operate without orthogonal coding of DCI messages (but still with OFDM transmission).

Further, when the base station operates with orthogonal coding of DCI messages, the base station may increase its transmission power from a level that the base station would use for transmission of either of the DCI messages alone, to help ensure success of the transmission. For instance, the base station may increase its transmission power on the effected resource elements by 3 dB or by some other level deemed sufficient for that purpose. Thus, without orthogonal coding of DCI messages, the base station may transmit each DCI message at a particular power level, and with orthogonal coding of DCI messages, the base station may transmit multiple orthogonally encoded DCI messages together at a higher power level.

Further, the base station may provide a control notification to served WCDs to notify the WCDs whether or not the base station is operating with orthogonal coding of DCI messages. For instance, the base station may add one or more additional bits to the PCFICH in each sub-frame, to provide a Boolean or other indication of whether the base station is operating with orthogonal coding of DCI messages.

Moreover, each such WCD may be provisioned in advance with an indication of the orthogonal codes that the base station would use when the base station operates with orthogonal coding of DCI messages, or the base station may broadcast an indication of those orthogonal codes, in a system information message or master information message for instance. Thus, a WCD receiving downlink transmission from the base station may read the control indication from the base station to determine whether the base station is operating with orthogonal coding of DCI messages. If so, the WCD may then engage in the enhanced blind decoding process as described above. Whereas, if not, the WCD may engage in a normal blind decoding process.

Figure 4:
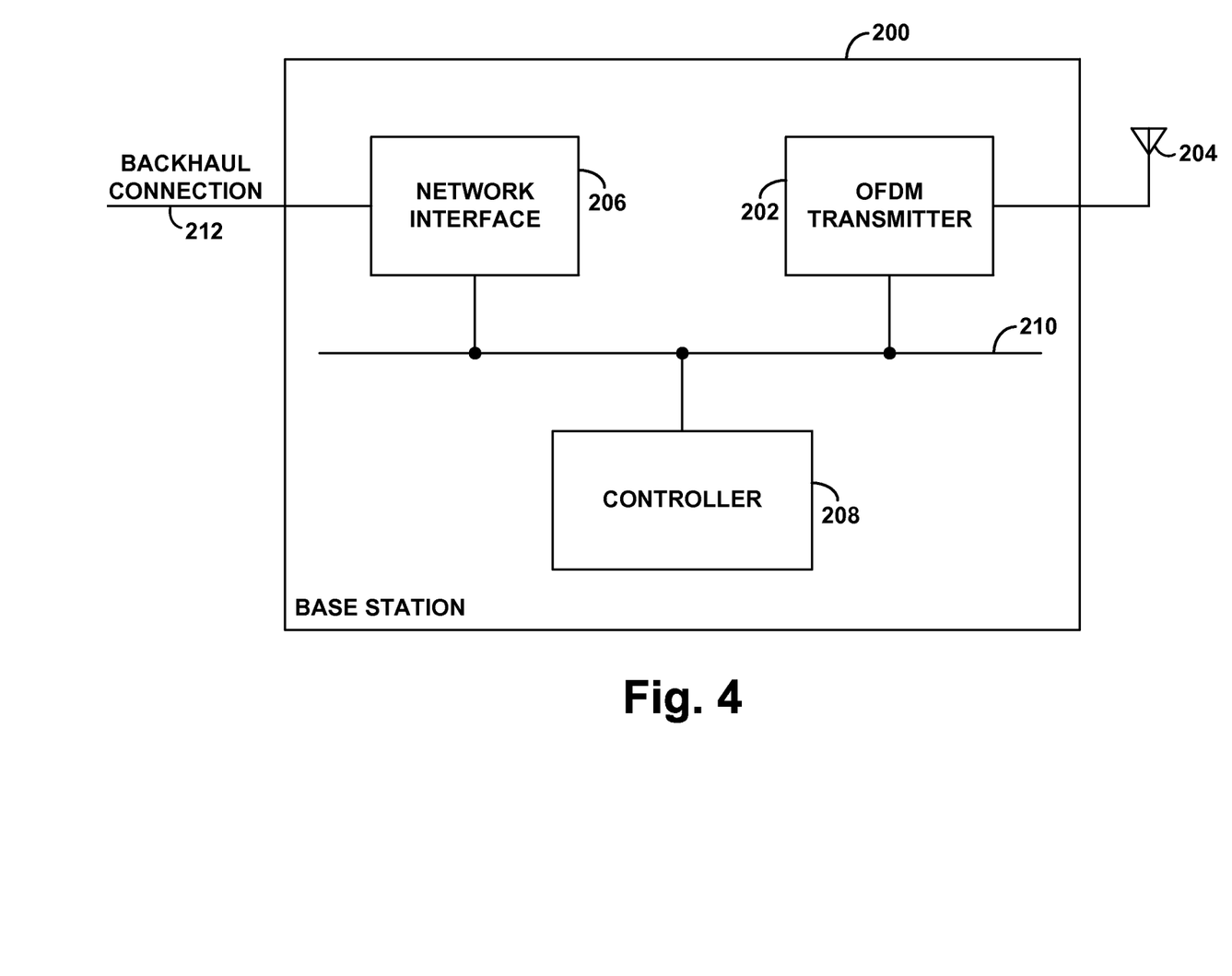
FIG. 4 is a simplified block diagram of a base station, in accordance with an example embodiment.

FIG. 4 is a simplified block diagram of an example base station 200. Base station 200 could, for example, be part of a communication system as shown in FIG. 1. Thus, base station 200 could correspond to base station 14. As shown in FIG. 4, base station 200 includes an OFDM transmitter 202 and associated antenna structure 204, as well as a network interface 206, and a controller 208, with various ones of these or other components being communicatively linked together by a system bus, network, or other connection mechanism 210.

OFDM transmitter 202 and antenna structure 204 may function in combination to provide an OFDM downlink air interface as described above. As such, the OFDM transmitter 202 is configured to receive data, generate OFDM symbols from the data, and transmit the OFDM symbols on the air interface. Network interface 206 may then comprise a wired and/or wireless network communication interface (such as an Ethernet interface) through which the base station may receive data over a backhaul connection 212 that connects base station 200 to one or more entities of a wireless network, such as a serving gateway (SGW) for instance, for transmission of the data to one or more WCDs served by the base station.

Controller 208 in base station 200 may control the transmission of data, including control and user data, on the downlink air interface. For example, controller 212 may allocate downlink resource blocks to WCDs and schedule generate DCI messages accordingly, and controller 212 may control transmission by OFDM transmitter 202 accordingly. Further, in line with the present method, controller 208 may monitor load on the downlink air interface and, based on the load, toggle the base station between operation with orthogonal coding of DCI messages and operation without orthogonal coding of DCI messages, carrying out various associated features as discussed above. And, when operating with orthogonal coding of DCI messages, controller may orthogonally encode and combine the DCI messages for transmission and control OFDM transmission accordingly. Controller 208 could be implemented using hardware, software, and/or firmware. For example, controller 208 could include one or more processors and a non-transitory computer readable medium (e.g., volatile and/or non-volatile memory) that stores executable instructions. The executable instructions, when executed by the one or more processors, may cause controller 208 to perform any of the base station functions described herein.

Figure 5:
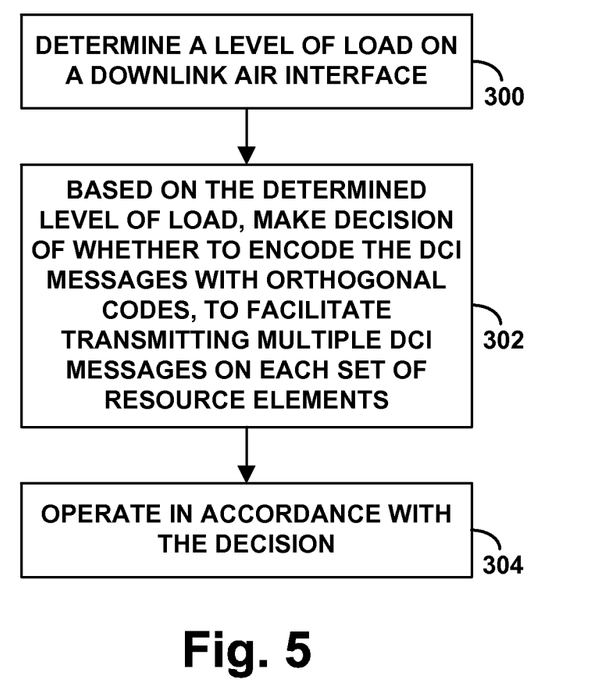
FIG. 5 is a flow chart depicting functions that can carried out by a base station in accordance with an example embodiment.

FIG. 5 is a flow chart illustrating an example method that may be performed by a base station, such as base station 200, in accordance with the present disclosure, in a scenario where the base station provides a downlink air interface may define a downlink control channel including a plurality of sets of resource elements each spanning a respective subcarrier and a respective segment of time, and where the base station transmits DCI messages to wireless communication devices (WCDs) on the downlink control channel.

As shown in FIG. 5, at block 300, the base station determines a level of load on a downlink air interface. At block 302, based on the determined level of load, the base station then makes decision of whether to encode the DCI messages with orthogonal codes, which would facilitate transmitting multiple DCI messages on each set of resource elements. And at block 304, the base station then operates in accordance with the decision. In particular, if the decision is to not encode the DCI messages with orthogonal codes, then, for each set of resource elements, the base station then responsively transmits on the set of resource elements just one DCI message without orthogonal coding of the DCI message. Whereas, if the decision is to encode the DCI messages with orthogonal codes, then, for each set of resource elements, the base station encodes a respective set of at least two of the DCI messages with orthogonal codes to produce at least two orthogonally encoded messages, and transmits a sum of the at least two orthogonally encoded DCI messages on the set of resource elements.

Further, as noted above, the base station may broadcast a control channel format indicator, and the act of operating in the accordance with the decision may involve the base including in the control channel format indicator a flag (e.g., at least one bit added in addition to bits specifying control channel size) to indicates, in accordance with the decision, whether DCI messages will be encoded with orthogonal codes. And when the base station operates with orthogonal coding of DCI messages and thus transmits a sum of at least two orthogonally encoded DCI messages on a set of resource elements, the base station may responsively do so at a transmission power level greater than a transmission power level at which the base station would transmit either one of the DCI messages alone.

Thus in practice, if the decision is to not encode the DCI messages with orthogonal codes, then, for each set of resource elements, the base station may allocate just one DCI message, and may transmit on the set of resource elements the one allocated DCI message without orthogonal coding. Whereas, if the decision is to encode the DCI messages with orthogonal codes, then, respectively for each set of resource elements, the base station may (i) allocate a respective set of n DCI messages, wherein n≥2, and (ii) encode the allocated respective set of n DCI messages with a set of n different orthogonal codes, including encoding each DCI message of the allocated respective set of n DCI messages respectively with one orthogonal code of the set of n different orthogonal codes, to produce a respective set of n orthogonally encoded DCI messages, and (iii) transmit on the set of resource elements a sum of the respective set of n orthogonally encoded DCI messages. Further, for every set of resource elements, the base station may use the same each set of n orthogonal codes to encode the respective set of n DCI messages allocated to the set of resource elements.

In line with the discussion above, each DCI message in this process may be destined to a respective WCD and may include (i) scheduling information designating an allocation of shared channel resources for carrying data between the base station and the WCD and (ii) a CRC value masked with an identifier of the WCD. Further, the downlink air interface may be an Orthogonal Frequency Division Multiple Access (OFDMA) air interface, such as an LTE air interface for instance, and the downlink control channel may be a PDCCH.

Moreover, also in line with the discussion above, the level of load on the downlink air interface may comprise a level of load on the downlink control channel and/or a level of load on a downlink shared traffic channel. And the act of making the decision, based at least in part on the determined level of load, of whether to encode the DCI messages with orthogonal codes to facilitate transmitting multiple DCI messages on each set of resource elements may involve (i) if the determined level of load exceeds a predefined threshold, then deciding to encode the DCI messages with orthogonal codes to facilitate transmitting multiple DCI messages on each set of resource elements, but (ii) if the determined level of load does not exceed the predefined threshold, then deciding to not encode the DCI messages with orthogonal codes.

Thus, for instance, the act of making the decision based at least in part on the determined level of load, of whether to encode the DCI messages with orthogonal codes to facilitate transmitting multiple DCI messages on each set of resource elements, may comprise (i) determining that the level of downlink control channel load is threshold high and that the level of downlink shared traffic channel load is threshold high, and (ii) responsively making the decision to encode the DCI messages with orthogonal codes to facilitate transmitting multiple DCI messages on each set of resource elements. Encoding the DCI messages with orthogonal codes to facilitate transmitting multiple DCI messages on each set of resource elements may thus help to minimize a size of the downlink control channel and thereby help to increase capacity for downlink shared traffic channel use, and/or may facilitate transmission of a greater number of DCI messages at once on the downlink control channel.

Figure 6:
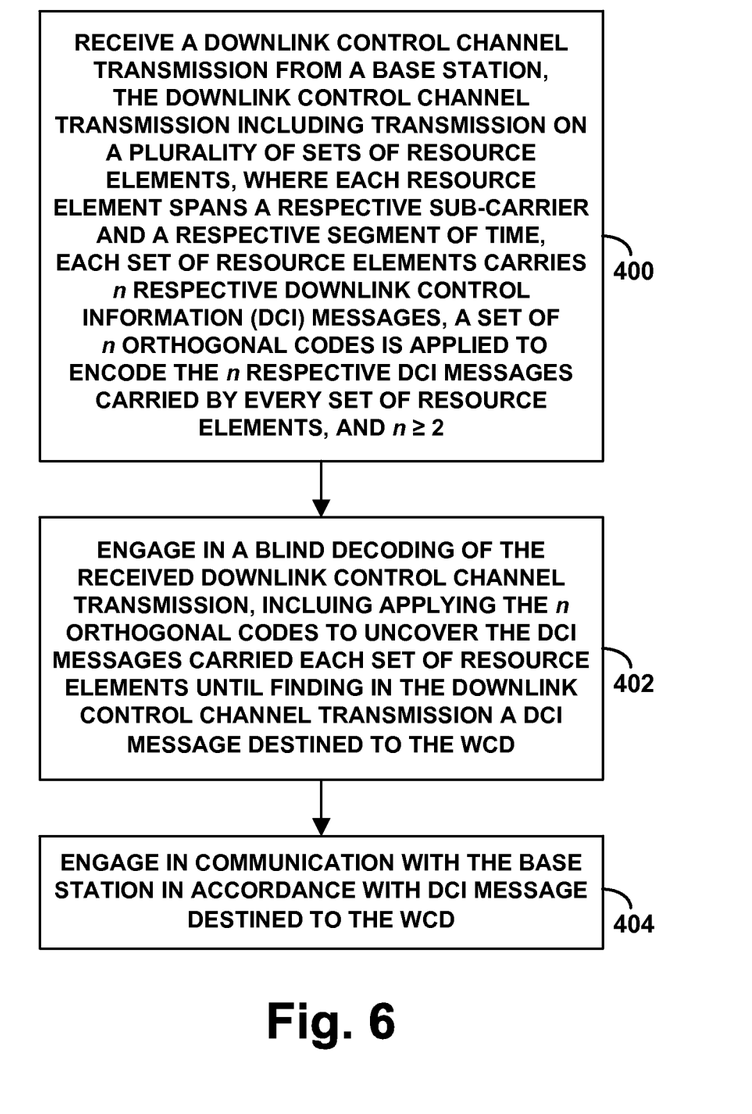
FIG. 6 is a flow chart depicting functions that can carried out by a WCD in accordance with an example embodiment.

Finally, FIG. 6 is a flow chart illustrating an example method that may be performed by a WCD, such as by one of WCDs 16-22 shown in FIG. 1. As shown in FIG. 6, at block 400, the WCD receives a downlink control channel transmission from a base station, where the downlink control channel transmission includes transmission on a plurality of sets of resource elements, where each resource element spans a respective sub-carrier and a respective segment of time, where each set of resource elements carries n respective downlink control information (DCI) messages, where a set of n orthogonal codes is applied to encode the n respective DCI messages carried by every set of resource elements, and where n≥2.

At block 402, the WCD then engages in a blind decoding of the received downlink control channel transmission, where engaging in the blind decoding of the received downlink control channel transmission involves applying the n orthogonal codes to uncover the DCI messages carried each set of resource elements until the WCD finds in the downlink control channel transmission a DCI message destined to the WCD. And at block 404, the WCD then engages in communication with the base station in accordance with DCI message destined to the WCD.

In line with the discussion above, the DCI message destined to the WCD in this process may include a CRC masked with an identifier of the WCD. In that case, the act of applying the n orthogonal codes to uncover the DCI messages carried each set of resource elements until the WCD finds in the downlink control channel transmission a DCI message destined to the WCD may comprise, for each set of resource elements, (i) applying each of the n orthogonal codes to uncover the DCI message encoded with the orthogonal code, and (ii) determining whether the uncovered DCI message includes a CRC masked with the identifier of the WCD, until the WCD finds a DCI message (if any) destined to the WCD.

Further, as discussed above, the WCD may also receive from the base station a control channel format indicator that includes a flag indicating whether DCI messages will be encoded with orthogonal codes, and the WCD may read the control channel format indicator to make a determination of whether the flag indicates that DCI messages will be encoded with orthogonal codes. In that case, the act of applying the n orthogonal codes to uncover the DCI messages may be responsive to at least the determination being that the flag indicates that DCI messages will be encoded with orthogonal codes.

Exemplary embodiments have been described above. Those skilled in the art will understand, however, that changes and modifications may be made to these embodiments without departing from the true scope and spirit of the invention.

We claim:

1. A method comprising:
 determining, by a base station, a level of load on a downlink air interface provided by the base station, wherein the downlink air interface defines a downlink control channel including a plurality of sets of resource elements each spanning a respective sub-carrier and a respective segment of time, and wherein the base station transmits downlink control information (DCI) messages to wireless communication devices (WCDs) on the downlink control channel;
 based at least in part on the determined level of load, making a decision by the base station of whether to encode the DCI messages with orthogonal codes to facilitate transmitting multiple DCI messages on each set of resource elements; and
 operating by the base station in accordance with the decision,
 wherein operating by the base station in accordance with the decision comprises: (a) if the decision is to not encode the DCI messages with orthogonal codes, then, for each set of resource elements, transmitting on the set of resource elements just one DCI message without orthogonal coding, but (b) if the decision is to encode the DCI messages with orthogonal codes, then, for each set of resource elements, encoding a respective set of at least two of the DCI messages with orthogonal codes to produce at least two orthogonally encoded messages, and transmitting a sum of the at least two orthogonally encoded DCI messages on the set of resource elements.

2. The method of claim 1, wherein, when the base station transmits a sum of at least two orthogonally encoded DCI messages on a set of resource elements, the base station does so at a transmission power level greater than a transmission power level at which the base station would transmit either one of the DCI messages alone.

3. The method of claim 1, wherein the base station broadcasts a control channel format indicator, and wherein operating by the base station in accordance with the decision further comprises including in the control channel format indicator a flag indicating, in accordance with the decision, whether DCI messages will be encoded with orthogonal codes.

4. The method of claim 3, wherein the control channel format indicator includes two bits specifying a size of the control channel, wherein including the flag in the control channel format indicator comprises providing the flag as at least a third bit in the control channel format indicator.

5. The method of claim 1, wherein each DCI message is destined to a respective WCD and includes (i) scheduling information designating an allocation of shared channel resources for carrying data between the base station and the WCD and (ii) a cyclic redundancy check value masked with an identifier of the WCD.

6. The method of claim 1, wherein the downlink air interface is an Orthogonal Frequency Division Multiple Access (OFDMA) air interface, wherein the downlink control channel is a Physical Downlink Control Channel (PDCCH).

7. A method comprising:
 determining, by a base station, a level of load on a downlink air interface provided by the base station, wherein the downlink air interface defines a downlink control channel including a plurality of sets of resource elements each spanning a respective sub-carrier and a respective segment of time, and wherein the base station transmits downlink control information (DCI) messages to wireless communication devices (WCDs) on the downlink control channel;
 based at least in part on the determined level of load, making a decision by the base station of whether to encode the DCI messages with orthogonal codes to facilitate transmitting multiple DCI messages on each set of resource elements; and
 operating by the base station in accordance with the decision,
 wherein operating by the base station in accordance with the decision comprises: (a) if the decision is to not encode the DCI messages with orthogonal codes, then, for each set of resource elements, allocating just one DCI message, and transmitting on the set of resource elements the one allocated DCI message without orthogonal coding, but (b) if the decision is to encode the DCI messages with orthogonal codes, then, respectively for each set of resource elements, (i) allocating a respective set of n DCI messages, wherein n≥2, and (ii) encoding the allocated respective set of n DCI messages with a set of n different orthogonal codes, including encoding each DCI message of the allocated respective set of n DCI messages respectively with one orthogonal code of the set of n different orthogonal codes, to produce a respective set of n orthogonally encoded DCI messages, and (iii) transmitting on the set of resource elements a sum of the respective set of n orthogonally encoded DCI messages.

8. The method of claim 7, wherein operating by the base station in accordance with the decision further comprises:
if the decision is to encode the DCI messages with orthogonal codes, then, for every set of resource elements, using the same each set of n orthogonal codes to encode the respective set of n DCI messages allocated to the set of resource elements.

9. The method of claim 8, wherein, when the base station transmits a sum of at least two orthogonally encoded DCI messages on a set of resource elements, the base station does so at a transmission power level greater than a transmission power level at which the base station would transmit either one of the DCI messages alone.

10. The method of claim 7, wherein n=2.

11. The method of claim 7, wherein each DCI message is destined to a respective WCD and includes (i) scheduling information designating an allocation of shared channel resources for carrying data between the base station and the WCD and (ii) a cyclic redundancy check value masked with an identifier of the WCD.

12. The method of claim 7, wherein the downlink air interface is an Orthogonal Frequency Division Multiple Access (OFDMA) air interface, wherein the downlink control channel is a Physical Downlink Control Channel (PDCCH).

13. A method comprising:
determining, by a base station, a level of load on a downlink air interface provided by the base station, wherein the downlink air interface defines a downlink control channel including a plurality of sets of resource elements each spanning a respective sub-carrier and a respective segment of time, and wherein the base station transmits downlink control information (DCI) messages to wireless communication devices (WCDs) on the downlink control channel;
based at least in part on the determined level of load, making a decision by the base station of whether to encode the DCI messages with orthogonal codes to facilitate transmitting multiple DCI messages on each set of resource elements; and
operating by the base station in accordance with the decision,
wherein the level of load on the downlink air interface comprises a level of load on the downlink control channel, and
wherein making the decision, based at least in part on the determined level of load, of whether to encode the DCI messages with orthogonal codes to facilitate transmitting multiple DCI messages on each set of resource elements comprises: (i) if the determined level of load exceeds a predefined threshold, then deciding to encode the DCI messages with orthogonal codes to facilitate transmitting multiple DCI messages on each set of resource elements, but (ii) if the determined level of load does not exceed the predefined threshold, then deciding to not encode the DCI messages with orthogonal codes.

14. The method of claim 13, wherein each DCI message is destined to a respective WCD and includes (i) scheduling information designating an allocation of shared channel resources for carrying data between the base station and the WCD and (ii) a cyclic redundancy check value masked with an identifier of the WCD.

15. The method of claim 13, wherein the downlink air interface is an Orthogonal Frequency Division Multiple Access (OFDMA) air interface, wherein the downlink control channel is a Physical Downlink Control Channel (PDCCH).

16. A method comprising:
determining, by a base station, a level of load on a downlink air interface provided by the base station, wherein the downlink air interface defines a downlink control channel including a plurality of sets of resource elements each spanning a respective sub-carrier and a respective segment of time, and wherein the base station transmits downlink control information (DCI) messages to wireless communication devices (WCDs) on the downlink control channel;
based at least in part on the determined level of load, making a decision by the base station of whether to encode the DCI messages with orthogonal codes to facilitate transmitting multiple DCI messages on each set of resource elements; and
operating by the base station in accordance with the decision,
wherein the level of load on the downlink air interface comprises a first level of load on the downlink control channel and a second level of load on a downlink shared traffic channel, and
wherein making the decision, based at least in part on the determined level of load, of whether to encode the DCI messages with orthogonal codes to facilitate transmitting multiple DCI messages on each set of resource elements comprises: (i) determining that the first level of load is threshold high and the second level of load is threshold high, and (ii) in response to determining that the first level of load is threshold high and the second level of load is threshold high, making the decision to encode the DCI messages with orthogonal codes to facilitate transmitting multiple DCI messages on each set of resource elements,
whereby, encoding the DCI messages with orthogonal codes to facilitate transmitting multiple DCI messages on each set of resource elements helps minimize a size of the downlink control channel and thereby helps increase capacity for downlink shared traffic channel use.

17. The method of claim 16, wherein each DCI message is destined to a respective WCD and includes (i) scheduling information designating an allocation of shared channel resources for carrying data between the base station and the WCD and (ii) a cyclic redundancy check value masked with an identifier of the WCD.

18. The method of claim 16, wherein the downlink air interface is an Orthogonal Frequency Division Multiple Access (OFDMA) air interface, wherein the downlink control channel is a Physical Downlink Control Channel (PDCCH).

19. A base station comprising:
a transmitter for transmitting over a downlink air interface to wireless communication devices (WCDs) operating in a wireless coverage area of the base station, wherein the downlink air interface defines a downlink control channel including a plurality of sets of resource elements each spanning a respective sub-carrier and a respective segment of time, and wherein the base station transmits downlink control information (DCI) messages to the WCDs on the downlink control channel; and
a controller, wherein the controller is configured to (i) determine, a level of load on the downlink air interface, (ii) based at least in part on the determined level of load, make a decision of whether to encode the DCI messages with orthogonal codes to facilitate transmitting multiple DCI messages on each set of resource elements, and (iii) cause the base station to operate in accordance with the decision,
wherein causing the base station to operate in accordance with the decision comprises: (a) if the decision is to not encode the DCI messages with orthogonal codes, then, for each set of resource elements, causing the transmitter to transmit on the set of resource elements just one DCI message without orthogonal coding, but (b) if the decision is to encode the DCI messages with orthogonal codes, then, for each set of resource elements, encoding a respective set of at least two of the DCI messages with orthogonal codes to produce at least two orthogonally encoded messages, and causing the transmitter to transmit a sum of the at least two orthogonally encoded DCI messages on the set of resource elements.

20. The base station of claim 19, wherein, when base station transmits a sum of at least two orthogonally encoded DCI messages on a set of resource elements, the base station does so at a transmission power level greater than a transmission power level at which the base station would transmit either one of the DCI messages alone.

* * * * *